(12) United States Patent
Townsend, IV et al.

(10) Patent No.: US 11,407,265 B2
(45) Date of Patent: Aug. 9, 2022

(54) TRAILER DOCKING DEVICE

(71) Applicants: Thomas Brook Townsend, IV, Palos Verdes Estates, CA (US); John Marian, Torrance, CA (US)

(72) Inventors: Thomas Brook Townsend, IV, Palos Verdes Estates, CA (US); John Marian, Torrance, CA (US)

(*) Notice: Subject to any disclaimer, the term of this patent is extended or adjusted under 35 U.S.C. 154(b) by 97 days.

(21) Appl. No.: 16/796,749

(22) Filed: Feb. 20, 2020

(65) Prior Publication Data

US 2020/0262258 A1 Aug. 20, 2020

Related U.S. Application Data

(60) Provisional application No. 62/808,229, filed on Feb. 20, 2019.

(51) Int. Cl.
*B60D 1/66* (2006.01)
*B60D 1/46* (2006.01)
(Continued)

(52) U.S. Cl.
CPC .............. *B60D 1/66* (2013.01); *B60D 1/06* (2013.01); *B60D 1/46* (2013.01); *B60D 1/52* (2013.01)

(58) Field of Classification Search
CPC .................................. B60D 1/60; B60D 1/605
See application file for complete search history.

(56) References Cited

U.S. PATENT DOCUMENTS 3,797,283 A * 3/1974 Honer ................ B60D 1/60
70/58
3,857,575 A * 12/1974 Lee .................... B60D 1/66
280/1

(Continued)

FOREIGN PATENT DOCUMENTS

CN 2934499 Y * 8/2007
EP 0105621 A2 * 4/1984 ............ B60D 1/60
(Continued)

*Primary Examiner* — Kevin Hurley
(74) *Attorney, Agent, or Firm* — Inskeep IP Group, Inc.

(57) ABSTRACT

The trailer docking device is a trailer hitch mounting dock with which can be secured to a trailer when the trailer is detached from the tow vehicle. The trailer docking device enables its user to load and unload the trailer while it is parked in a garage, warehouse, carport or parking slab. The trailer docking device is steel constructed, height-adjustable, permanently mounted receiver hitch that is bolted to concrete slab flooring. The trailer docking device is vertically adjustable and includes a mounting base which may be used to affix the device to a permanent surface, such as a cement slab or asphalt surface, and a trailer hitch mounted at the top of a telescoping riser assembly. An empty trailer can be secured to the trailer docking device in the same fashion as mounting a trailer to a tow vehicle, and once coupled, the trailer can be loaded and unloaded. This allows for more efficient use of garage space. Generally, when trailers are not in tow, they are not intended to bear the weight of a load because they easily tip rearward when the trailer coupler is unattached. The trailer docking device secures the trailer coupler to the ball hitch and facilitates the functionality of being able to load and unload the trailer.

21 Claims, 10 Drawing Sheets

(51) Int. Cl.
*B60D 1/06* (2006.01)
*B60D 1/52* (2006.01)

(56) References Cited

U.S. PATENT DOCUMENTS

| | | | | |
|---|---|---|---|---|
| 4,373,303 | A * | 2/1983 | Stratichuk | E04B 1/34347 52/165 |
| 4,756,172 | A * | 7/1988 | Weaver | B60D 1/60 70/234 |
| 6,019,337 | A * | 2/2000 | Brown | B60D 1/60 248/352 |
| 6,406,052 | B1 * | 6/2002 | Bale | B60D 1/06 280/507 |
| 7,455,277 | B2 * | 11/2008 | Bishop | E05B 73/00 248/156 |
| 9,908,378 | B1 * | 3/2018 | Helms | B60D 1/60 |
| 11,014,591 | B2 * | 5/2021 | Parrish | B62B 3/10 |
| 11,084,653 | B1 * | 8/2021 | Weber | B62B 5/0079 |
| 2001/0052252 | A1 * | 12/2001 | Farmer | B60D 1/60 70/285 |
| 2020/0324597 | A1 * | 10/2020 | Wilson | B60D 1/60 |

FOREIGN PATENT DOCUMENTS

| | | | | |
|---|---|---|---|---|
| GB | 2272673 | A * | 5/1994 | B60R 25/00 |
| GB | 2443879 | A * | 5/2008 | B60D 1/60 |
| GB | 2465821 | A * | 6/2010 | B60R 25/00 |
| WO | WO-9515864 | A1 * | 6/1995 | B60D 1/60 |

* cited by examiner

TRAILER DOCKING DEVICE

RELATED APPLICATIONS

This application claims priority to U.S. Provisional Application Ser. No. 62/808,229 filed Feb. 20, 2019 entitled Trailer Docking Device, which is hereby incorporated herein by reference in its entirety.

FIELD OF THE INVENTION

The present invention pertains to a trailer docking device or trailer park which is used to secure the front end of a trailer when the trailer is detached from a tow vehicle.

BACKGROUND OF THE INVENTION

Large transport trailers usually have compound rear wheels and a pair of small dolly wheels positioned between these rear wheels. When this kind of trailer is disconnected from the towing vehicle, the trailer is supported on its compound rear wheels and dolly wheels. Due to the location of the dolly wheels at a substantial distance from the forward end of the trailer, the positioning of a heavy load in the extreme forward end of the trailer can result in an unbalancing of the trailer to the extent that it may tip over in a forward direction and further cause dangerous uncontrolled forward motion of the trailer. Similarly, the trailer may easily tip rearward after positioning a heavy load in the rear end of the trailer when it is disconnected from the tow vehicle. Therefore, there is a need to develop a trailer docking device which secures the trailer coupler at the front end of the trailer and allows loading and unloading of heavy loads inside and from the trailer when the trailer is disconnected from the tow vehicle.

The present invention provides an auxiliary trailer docking device or trailer park which is used to safely secure a trailer when the trailer is disconnected from the towing vehicle. Thus, the inside area of the trailer can be used as a functional space when the trailer in not connected with the tow vehicle. The trailer of the present invention includes but not limited to recreational vehicle trailer and trailer used for towing cars, trucks, off-road vehicles, motorcycles, snow mobile, go-carts, small tractors and small cargo trailer.

OBJECTS AND SUMMARY OF THE INVENTION

The present application overcomes the problem of tipping forward or rearward directions of the detached trailer while positioning of heavy loads in the forward or rear ends of the trailer when the trailer is coupled to the trailer docking device.

Another aspect of the present invention is that the trailer docking device may be mounted on a permanent floor, for example, a concrete floor, through mounting holes positioned on a baseplate of a base of the trailer docking device.

Yet another aspect of the present invention is that an empty trailer may be secured to the trailer docking device in the same fashion as mounting a trailer to a tow vehicle, and once coupled, the trailer can be loaded and used as a storage space allowing more efficient use of a garage space.

Another aspect of the present invention is that the enthusiasts owning hobby cars, motorcycles, off road vehicles (ORV), snowmobiles and equipment, contend with the necessity to leave the trailer connected or hitched to the tow vehicle while loading or unloading because the tow vehicle provides a stable platform to secure the trailer. Once the trailer is unhitched from the tow vehicle, the operator is unable to load or unload without the front of the trailer from tipping upward, creating a significant safety hazard.

Yet in another embodiment, the Trailer Park optimizes the space where it is located. On the footprint of a single parking space the user can park his or her trailer in the desired location, plus park a car or recreational vehicle on the trailer as well, doubling the use of the space.

In some embodiments of the present invention, the trailer docking device comprises a base including a baseplate defining a plurality of holes usable to secure the baseplate to a permanent surface, a riser extending vertically from the baseplate and a ball mount attached to and supported by the riser.

According to some embodiments, the riser comprises a first tubular post extending upwardly from said baseplate and said first tubular post comprises an aperture extending from a first side to a second side of said first tubular post. The riser further comprises a second tubular post comprising a ball mount attached to a tongue having a hitch ball at a first end and a plurality of apertures positioned downwardly and extending from a first side to a second side of said second tubular post. In some embodiments, a trailer coupler of the detached trailer is attached to said tongue by said hitch ball.

In some embodiments, the second tubular post is configured to be slidably locked inside said first tubular post at a plurality of heights relative to said first tubular post when said aperture of said first tubular post is aligned with at least one of said plurality of apertures of said second tubular post and is locked in place with a locking pin.

In some preferred embodiments, the base plate and riser of the trailer docking device may be constructed of steel. However, the construction metal of the trailer docking device is not limited to steel only. In some embodiments, the base plate and riser may be constructed of a different metal, for example, aluminum.

In some embodiments, the trailer docking device of the present invention includes a base, a riser and a trailer hitch instead of a ball mount 160. The trailer hitch may be welded to the top of the riser so that the users may install their own ball mount into the trailer hitch.

In some embodiments, the present application describes a method of securing a trailer having a coupler or a ball mount to a permanent surface by securing a docking device to the permanent surface, the docking device having a ball mount or a trailer hitch, placing the coupler or the ball mount of the trailer over the ball mount or the trailer hitch and latching the coupler of the trailer to the ball mount of the docking device or the ball mount of the trailer to the trailer hitch of the docking device.

In some embodiments the coupling the trailer coupler is achieved by aligning said trailer coupler with a hole at a distal end of a tongue attached the ball mount and inserting a hitch ball through the hole and the trailer coupler and securing the hitch ball in place with a lock washer and a lock nut.

In some embodiments, a trailer attached to the trailer ball mount may be secured to the trailer hitch by inserting a rectangular hollow tube of the trailer ball mount inside a rectangular hollow tube of the trailer hitch and securing them by aligning and locking the mounting holes.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
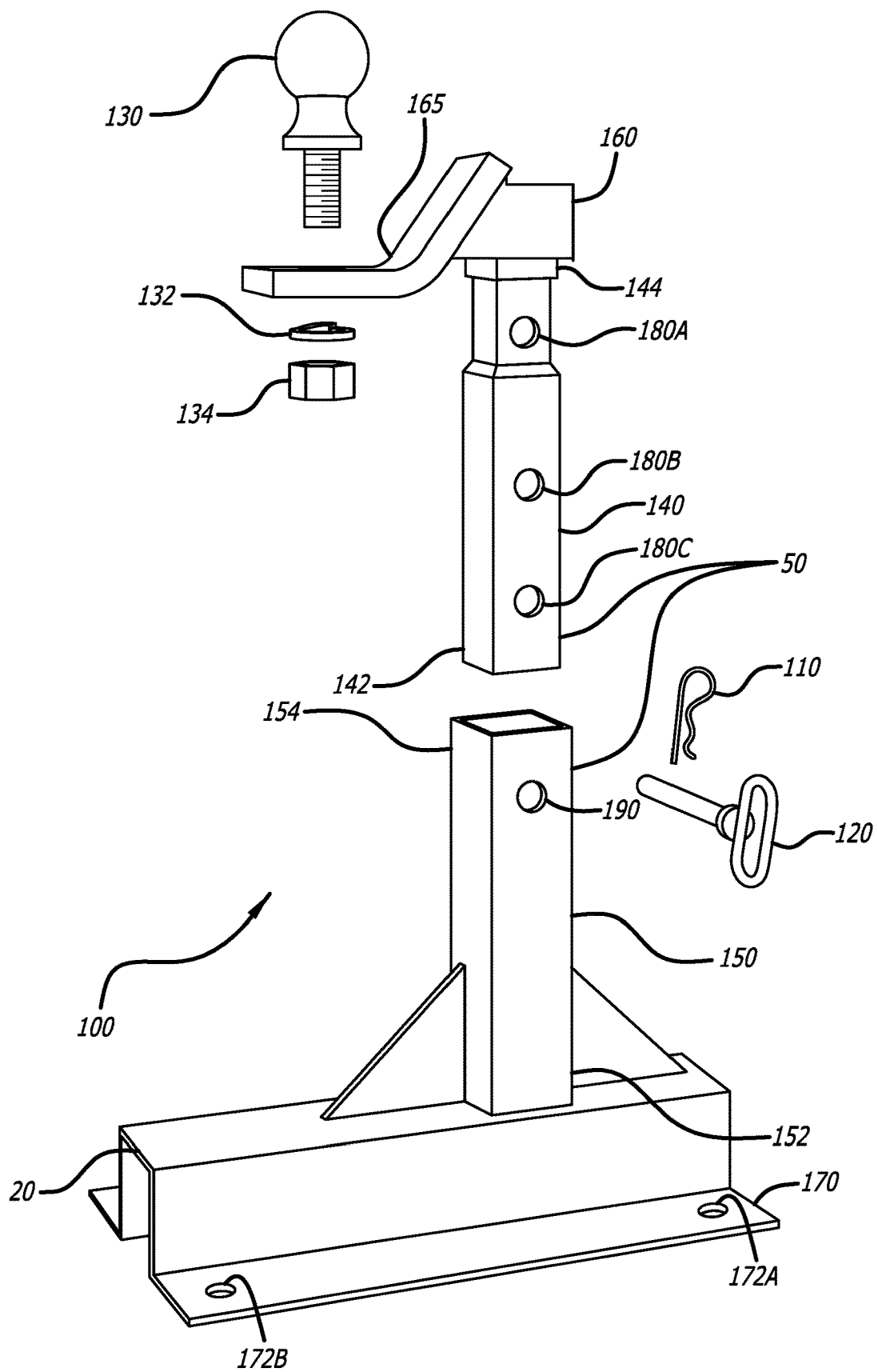
FIG. 1 is an exploded perspective view of the trailer docking device of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Referring initially to FIG. 1, the trailer docking device 100 of the present invention generally includes a base 20, a riser 50 and a ball mount 160. The base 20 comprises a flanged baseplate 170 which may be permanently mounted on a concrete floor of a garage, warehouse, carport or parking slab through mounting holes 172A-172D, positioned in equal numbers on both sides of the baseplate 170, using mounting bolts. The area of the baseplate 170 comprises the length and width of the baseplate 170 (not shown in figures). In some embodiments of the present invention, a length of the baseplate is about 16 inches and a width of the baseplate is about 8.5 inches. Without limiting the length and width of the baseplate 170 to any particular dimension, the length and width of the baseplate 170 may be of any dimensions. The length and width of the baseplate 170 are sufficient to provide adequate support during loading and unloading of the trailer (not shown in the figures) when the trailer is disconnected from the tow vehicle. In some embodiments, the baseplate 170 is made of steel.

As can be seen in FIG. 1, the riser 50 further comprises a first tubular post 150 having a lower end 152 and an upper end 154, wherein the upper end 154 extends upwardly from the baseplate 170 and the lower end 152 is permanently attached, in some embodiments by welding, to the baseplate 170. The first tubular post 150 comprises a single aperture 190 positioned near the upper end 154 in one side of the first tubular post 150 and extends through the other side of the first tubular post 150. In some embodiments, the first tubular post comprises a rectangular cross-section.

The riser 50 further comprises a second tubular post 140 having a lower end 142 and an upper end 144, wherein the upper end 144 is permanently attached to the ball mount 160. In some embodiments, the second tubular post 140 comprises plurality of apertures 180A-180C, vertically disposed along the length of the second tubular post 140 and positioned on one side of the of the second tubular post 140 and extends through the other side of the second tubular post 140.

The first tubular post 150 comprises a bigger rectangular cross-section than the second tubular post 140 such that the second tubular post 140 may be inserted inside the first tubular post 150. In some embodiments, the plurality of apertures 180A-180C of the second tubular post 140 are configured to be vertically aligned with the single aperture 190 of the first tubular post 150 when the second tubular post 140 slides into the first tubular post 150. The vertical alignment of the apertures 180A-180C of the second tubular post 140 with the aperture 190 of the first tubular post 150 fixes the second tubular post 140 inside the first tubular post 150 by using a height adjustment pin 120 and a locking clip 110. The diameter of the height adjustment pin 120 is smaller than the diameters of the apertures 180A-180C of the second tubular post 140 and diameter of the aperture 190 of the first tubular post 150 such that the height adjustment pin 120 is insertable through the apertures 180A-180C and 190 and locked by the locking clip 110 on the other end.

In some embodiments, the first tubular post 150 and the second tubular post 140 are constructed of steel.

The ball mount has a tongue 165. The tongue 165 comprises an aperture (not shown) positioned distal from the end of the tongue welded to the ball mount 160. A standard hitch ball 130 is configured to slide through the aperture of the tongue 165. A trailer coupler (not shown in figures) may be locked to the tongue 165 by inserting the hitch ball 130 through the trailer coupler and the aperture of the tongue 165 and securing the bottom portion of the hitch ball 130 with a lock washer 132 and a lock nut 134. Any desired hitch ball may be fastened to the tongue as is known in the art.

Figure 2:
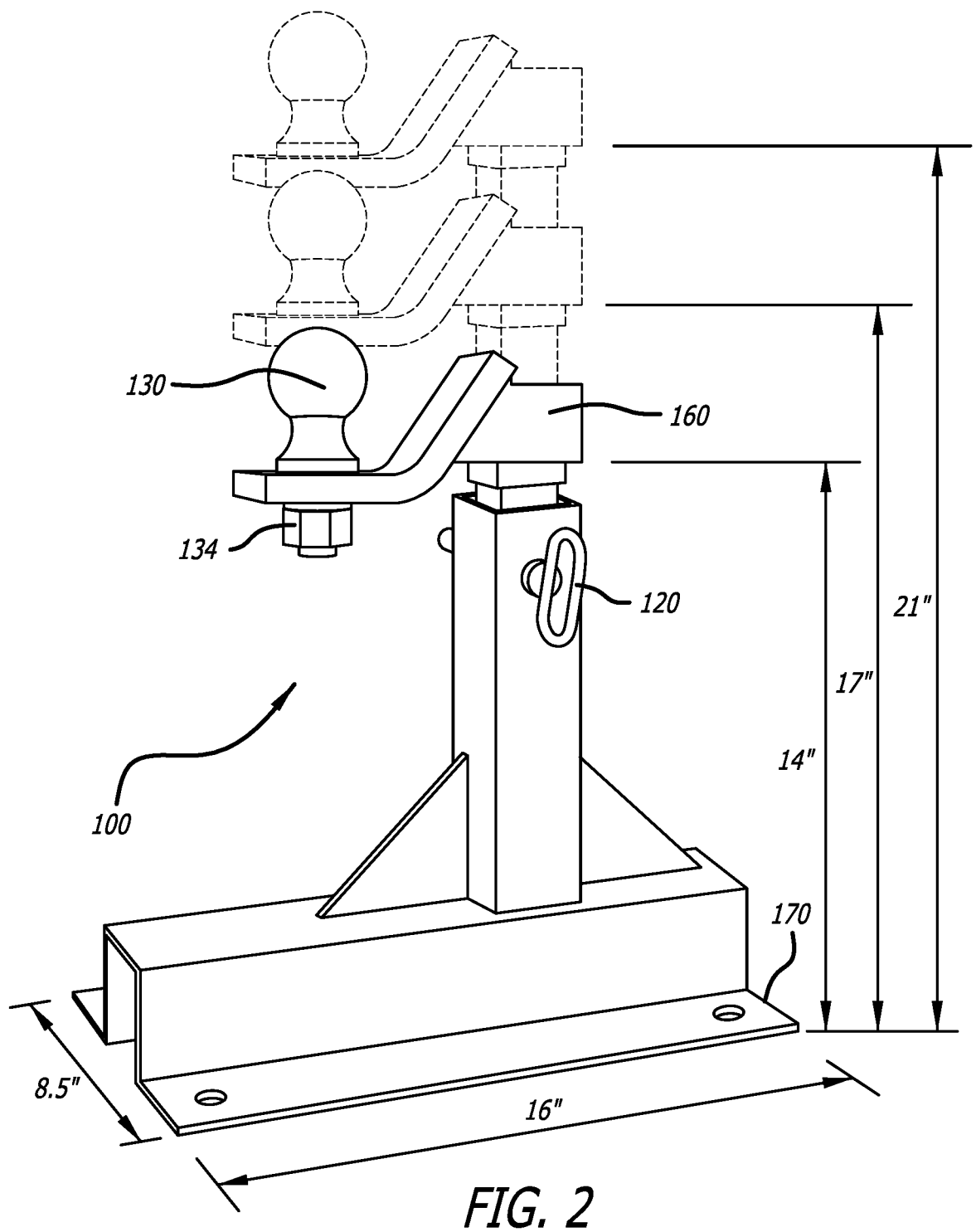
FIG. 2 is a perspective view of the trailer docking device with adjustable heights of the vertical neck.

Referring now to FIG. 2, a height adjustment mechanism of the of the trailer docking device 100 is illustrated. First, the second tubular post 140 with smaller rectangular crosssection slides inside the first tubular post 150 with larger rectangular cross-section. Each of the plurality of the apertures 180A-180C of the second tubular post 140 is aligned with the single aperture 190 of the first tubular post 150 and the height adjustment pin 120 having smaller diameter than those of the apertures 180A-180C and 190 is inserted through the aligned first tubular post aperture 190 and any of the second tubular post apertures 180A-180C to fix the vertical position of the second tubular post 140 relative to the first tubular post 150 at different heights. After fixing the position of the second tubular post inside the first tubular post 150, the height adjustment pin 120 is locked at that position with the locking clip 110.

In some embodiments, the height of the trailer docking device 100 from the baseplate 170 to the upper end 144 or the tongue 165 of the second tubular post 140 is 14 inches when the second tubular post 140 is locked inside the first tubular post 150 by aligning the aperture 180C of the second tubular post 140 with the aperture 190 of the first tubular post. In some embodiments, the height of the trailer docking device 100 from the baseplate 170 to the upper end 144 or the tongue 165 of the second tubular post 140 is 17 inches when the second tubular post 140 is locked inside the first tubular post 150 by aligning the aperture 180B of the second tubular post 140 with the aperture 190 of the first tubular post. In some embodiments, the height of the trailer docking device 100 from the baseplate 170 to the upper end 144 or the tongue 165 of the second tubular post 140 is 21 inches when the second tubular post 140 is locked inside the first tubular post 150 by aligning the aperture 180A of the second tubular post 140 with the aperture 190 of the first tubular post. Without limiting the heights of the trailer docking device 100 from the baseplate 170 to the upper end 144 or the tongue 165 of the second tubular post 140 to 14 inches, 17 inches and 21 inches, the heights can be of any height depending on the hitch heights of the trailer to be docked to the device 100.

Figure 3:
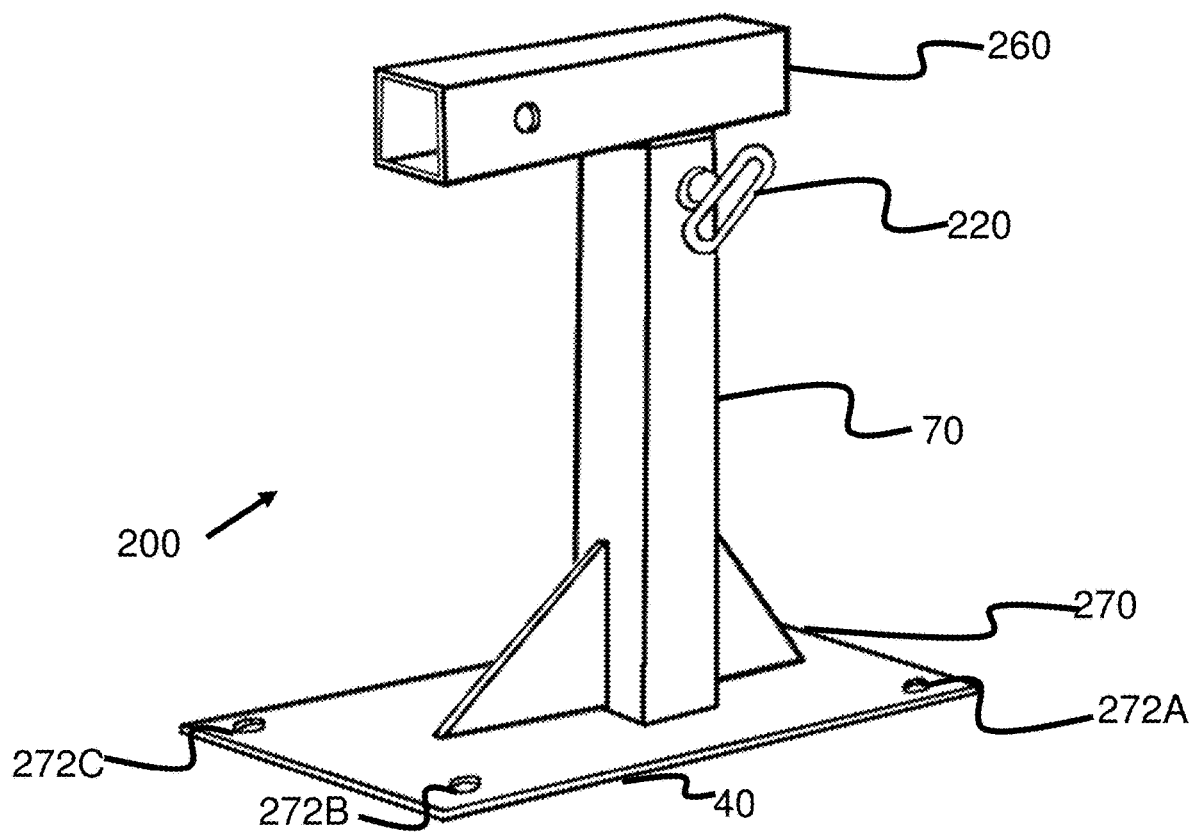
FIG. 3 is a perspective view of a different embodiment of the trailer docking device with a trailer hitch.

Referring now to FIG. 3, in some embodiments, the trailer docking device 200 of the present invention includes a base 40, a riser 70 and a trailer hitch 260 instead of a ball mount 160 as seen previously in FIGS. 1 and 2. The trailer hitch 260 may be welded to the top of the riser 70 so that the users may install their own ball mount 282 (shown in FIG. 5) inside the trailer hitch 260. This ensures that the device is compatible with whatever trailer the user is towing.

FIG. 3 further shows that the base 40 of the present embodiment comprises a flat baseplate 270 which may be permanently mounted on a concrete floor of a garage, warehouse, carport or parking slab through mounting holes 272A-272D using mounting bolts 274A-274D (FIG. 5), wherein the mounting holes 272A-272D are positioned in equal numbers on both sides of the baseplate 270. The length and width of the baseplate 270 are sufficient to provide adequate support during loading and unloading of the trailer (not shown in the figures) when the trailer is disconnected from the tow vehicle. In some embodiments, the baseplate 270 is made of steel.

Figure 4:
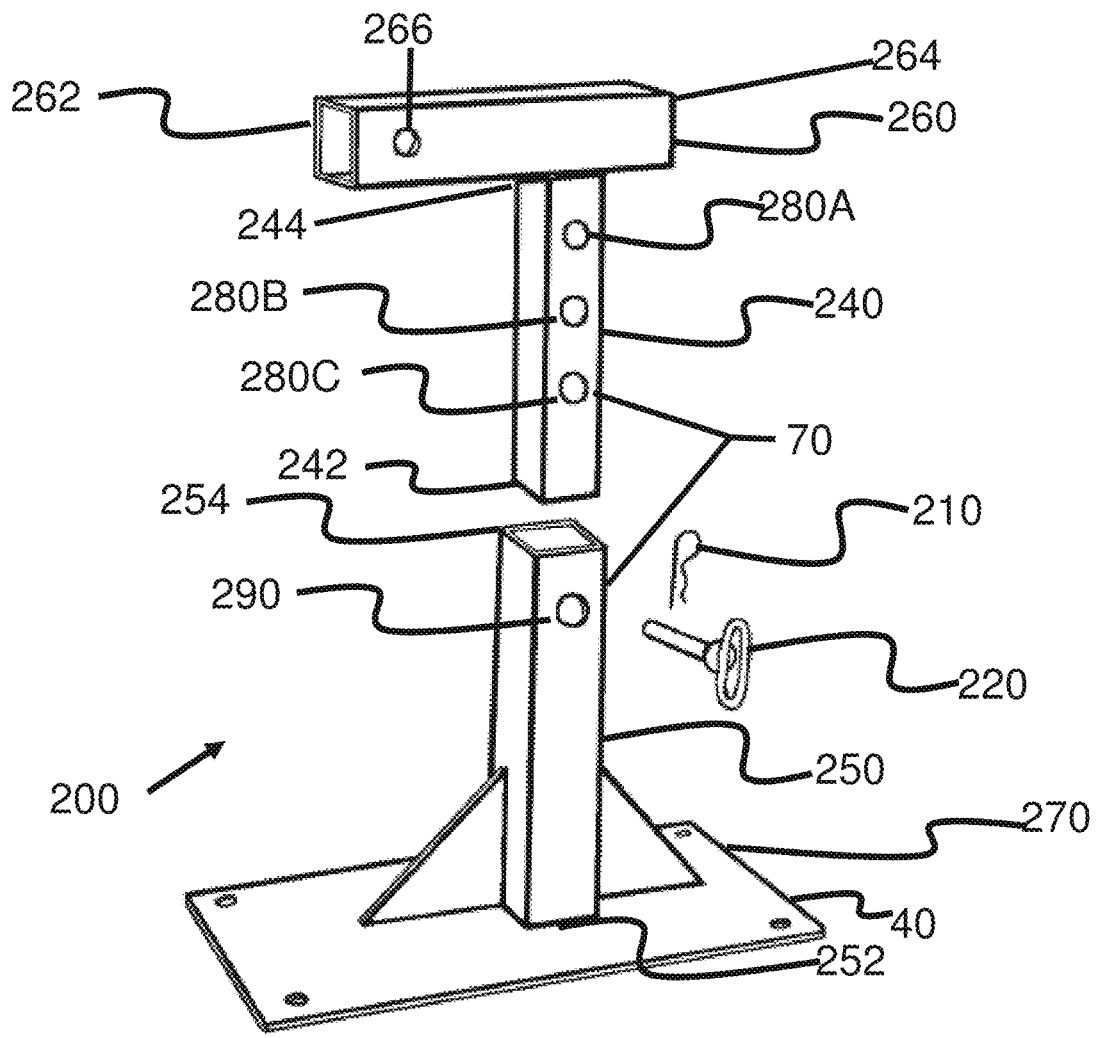
FIG. 4 is an exploded perspective view of the trailer docking device of FIG. 3.

Referring to FIG. 4, the riser 70 of the present embodiment further comprises a first tubular post 250 having a lower end 252 and an upper end 254, wherein the upper end 254 extends upwardly from the baseplate 270 and the lower end 252 is permanently attached, in some embodiments by welding, to the baseplate 270. The first tubular post 250 comprises a single aperture 290 positioned near the upper end 254 in one side of the first tubular post 250 and extends through the other side of the first tubular post 250. In some embodiments, the first tubular post 250 comprises a rectangular or square cross-section.

The riser 70 further comprises a second tubular post 240 having a lower end 242 and an upper end 244, wherein the upper end 244 is permanently attached to the trailer hitch 260. In some embodiments, the second tubular post 240 comprises plurality of apertures 280A-280C, vertically disposed along the length of the second tubular post 240 and positioned on one side of the of the second tubular post 240 and extends through the other side of the second tubular post 240.

According to some embodiments, the first tubular post 250 comprises a bigger rectangular cross-section than the second tubular post 240 such that the second tubular post 240 may be inserted inside the first tubular post 250. In some embodiments, the plurality of apertures 280A-280C of the second tubular post 240 are configured to be vertically aligned with the single aperture 290 of the first tubular post 250 when the second tubular post 240 slides into the first tubular post 250. The vertical alignment of the apertures 280A-280C of the second tubular post 240 with the aperture 290 of the first tubular post 250 fixes the second tubular post 240 inside the first tubular post 250 by using a height adjustment pin 220 and a locking clip 210. The diameter of the height adjustment pin 220 is smaller than the diameters of the apertures 280A-280C of the second tubular post 240 and diameter of the aperture 290 of the first tubular post 250 such that the height adjustment pin 220 is insertable through the apertures 280A-280C and 290 and locked by the locking clip 210 on the other end.

In some embodiments, the first tubular post 250 and the second tubular post 240 are constructed of steel.

The trailer hitch 260 may be a rectangular hollow tube with one open end 262 and another end 264 that is either open or closed. A mounting hole 266 is positioned near the open end 262 on one side of the rectangular hollow tube 260 and extends through the other side.

Figure 5:
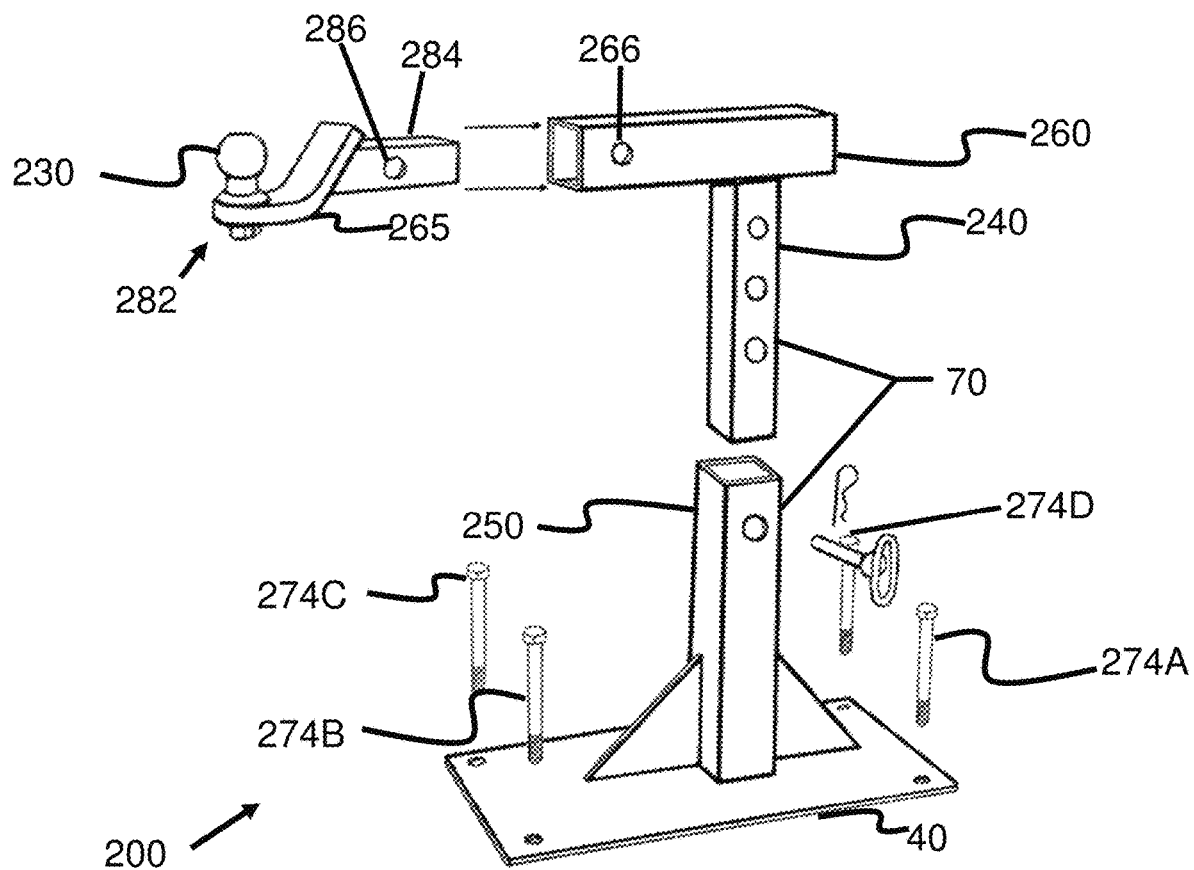
FIG. 5 is a perspective view of the trailer docking device of FIG. 3 with attachable ball mount of the trailer.

FIG. 5 shows the trailer ball mount 282 in detail. The ball mount 282 may be a standard ball mount, which typically include another rectangular hollow tube 284 attached with a tongue 265 at one end. The rectangular hollow tube 284 includes a mounting hole 286 positioned approximately in the middle on one side of the rectangular hollow tube 284 and extends through the other side.

The tongue 265 comprises an aperture (not shown) positioned distal from the end of the tongue 265 welded to the rectangular hollow tube 284. A standard hitch ball 230 is configured to be bolted through the aperture of the tongue 265. A trailer (not shown in figures) attached to the trailer ball mount 282 may be secured to the trailer hitch 260 positioned on the riser 70 by inserting the rectangular hollow tube 284 inside the rectangular hollow tube of the trailer hitch 260 and securing it inside by aligning and locking the mounting holes 266 and 286. Any desired size of hitch ball 230 may be used with the tongue 265 as is known in the art.

Figure 6:
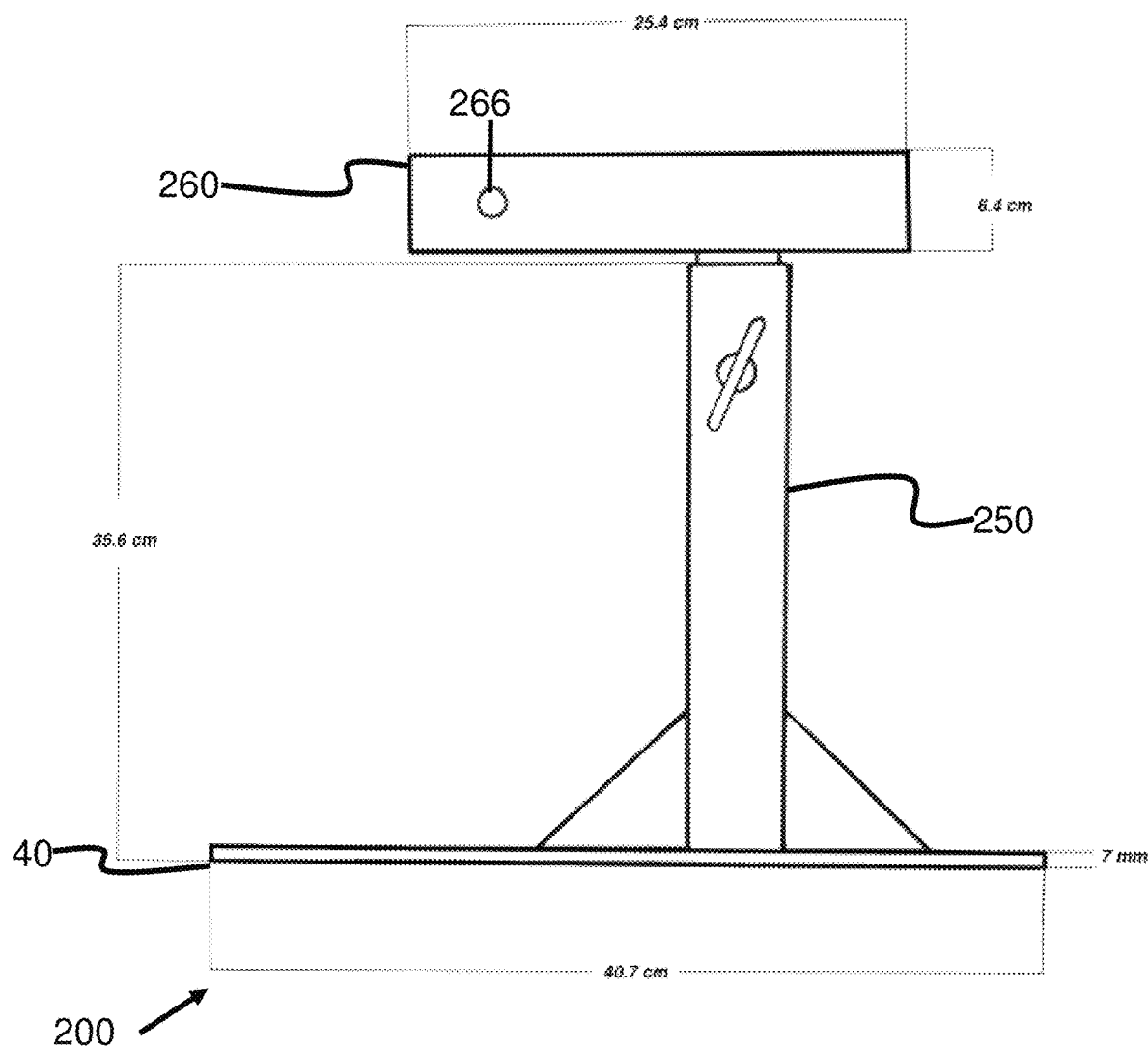
FIG. 6 is a side view of FIG. 3 with varying lengths of a base, a riser and a trailer hitch.
Figure 7:
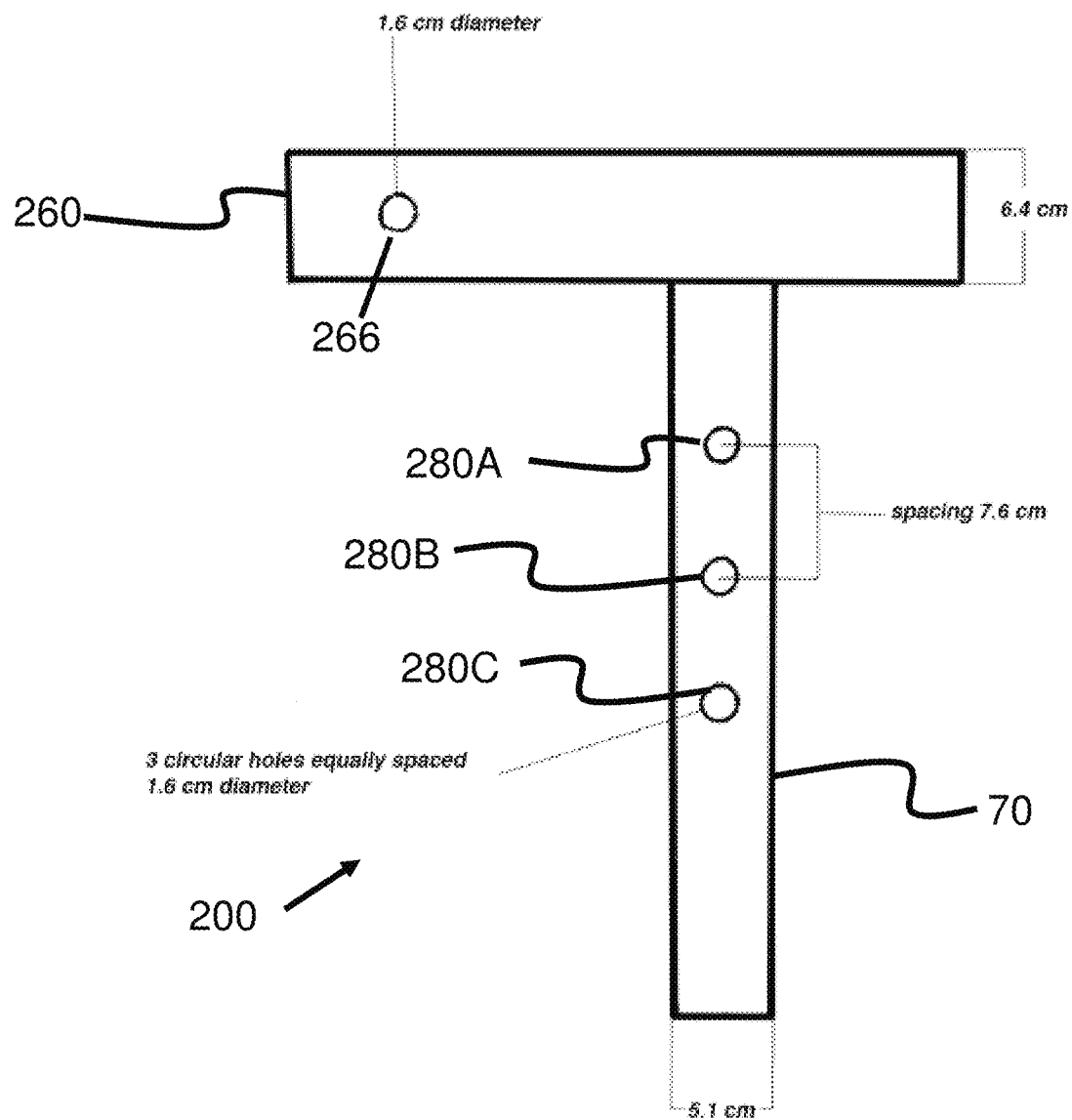
FIG. 7 is a side view of the trailer hitch and riser of FIG. 3.

FIGS. 6 and 7 show the dimensions of the different parts of the trailer docking device 200. For example, the rectangular hollow tube of the trailer hitch 260 comprises a length of 25.4 cm and an outer height of 6.4 cm. In some embodiments, a height of the first tubular post 250 is 35.6 cm. In some embodiments, a length of the base 40 is 40.7 cm and a width of the base 40 is 7 mm. These figures are not meant to be limiting. Rather they provide context to the device and an example of an embodiment that has been tested with good results.

FIG. 7 further shows that a diameter of the mounting hole 266 positioned on one the rectangular hollow tube of the trailer hitch 260 is 1.6 cm and the plurality of apertures 280A-280C vertically disposed along the length of the second tubular post 240 are equally spaced apart with a distance of 7.6 cm from each other. However, the dimensions of the different parts of the trailer docking device 200 are not limited to the above dimensions and they may be of any dimensions as is known in the art.

Figure 8A:
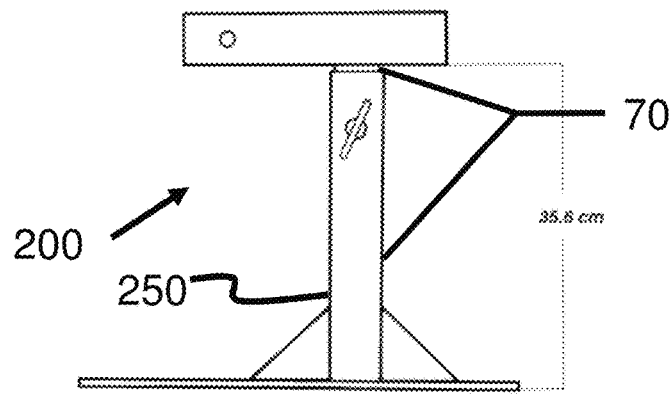
FIGS. 8A-8C show adjustable heights of the trailer docking device of FIG. 3.
Figure 8B:
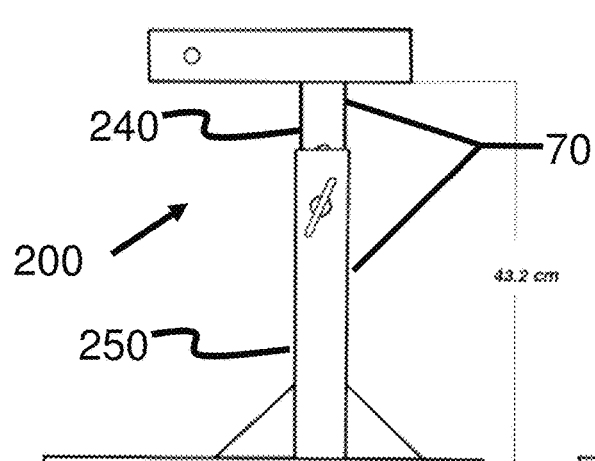
Figure 8C:
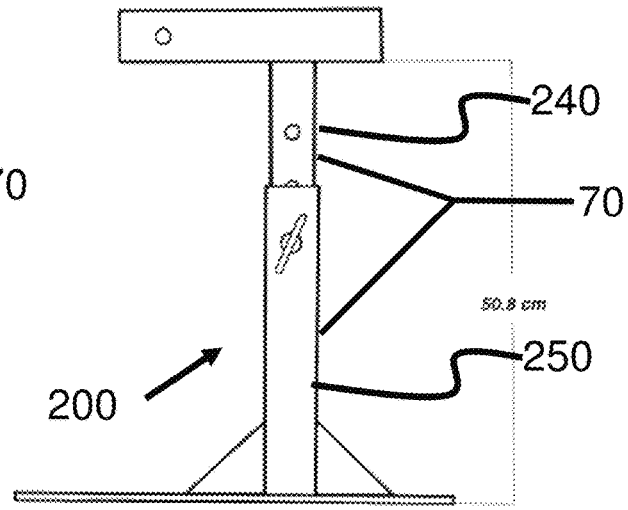

Referring now to FIGS. 8A-8C, a height adjustment mechanism of the of the trailer docking device 200 is illustrated. First, the second tubular post 240 with smaller rectangular cross-section slides inside the first tubular post 250 with larger rectangular cross-section. Each of the plurality of apertures 280A-280C of the second tubular post 240 is aligned with the single aperture 290 of the first tubular post 250 and the height adjustment pin 220 having smaller diameter than those of the apertures 280A-280C and 290 is inserted through the aligned first tubular post aperture 290 and any of the second tubular post apertures 280A-280C to fix the vertical position of the second tubular post 240 relative to the first tubular post 250 at different heights. After fixing the position of the second tubular post 240 inside the first tubular post 250, the height adjustment pin 220 is locked at that position with the locking clip 210. In some embodiments, when the aperture 280A of the second tubular post 240 is aligned with the single aperture 290 of the first tubular post 250 (FIG. 8A), a vertical height of 35.6 cm of the riser 70 is obtained. In some embodiments, when the aperture 280B of the second tubular post 240 is aligned with the single aperture 290 of the first tubular post 250 (FIG. 8B), a vertical height of 43.2 cm of the riser 70 is obtained. In some embodiments, when the aperture 280C of the second tubular post 240 is aligned with the single aperture 290 of the first tubular post 250 (FIG. 8C), a vertical height of 43.2 cm of the riser 70 is obtained.

Figure 9:
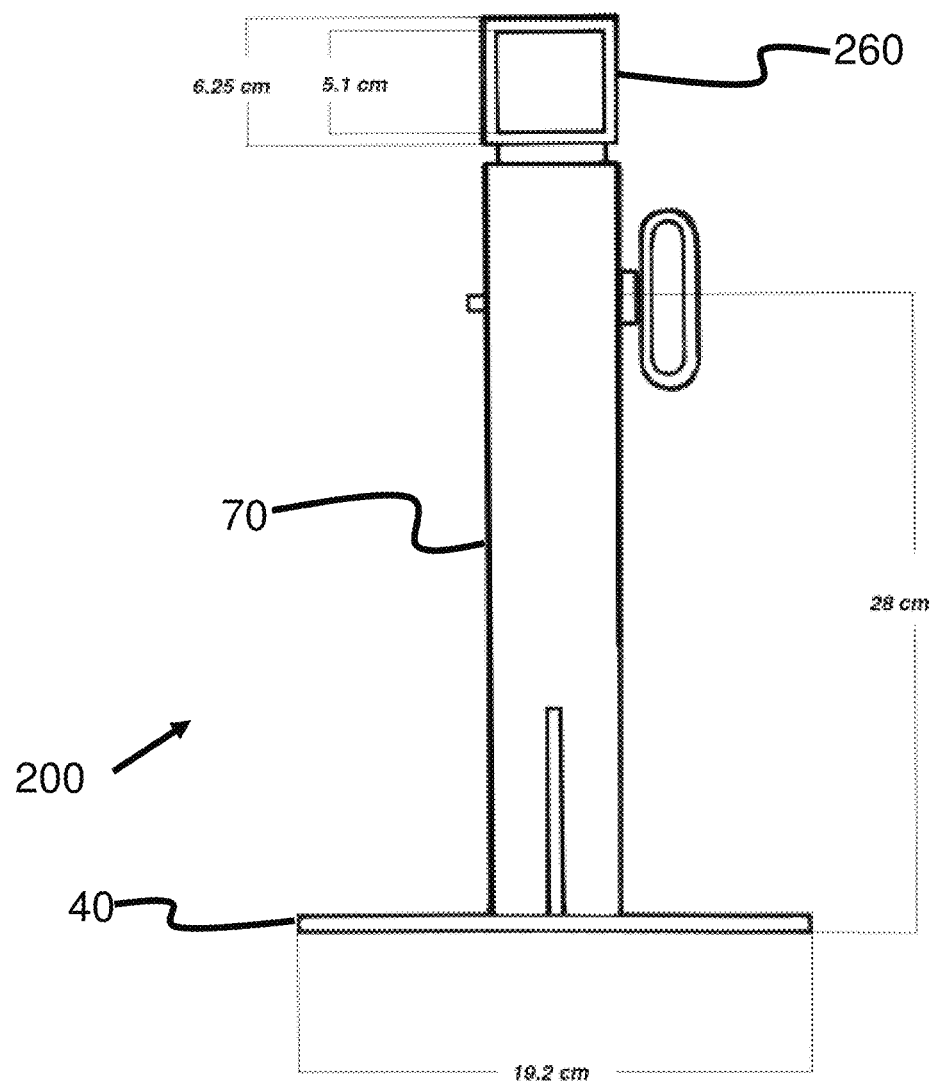
FIG. 9 is a front view of the trailer docking device of FIG. 3.

FIG. 9 further discloses that a height of the single aperture 290 of the first tubular post 250 from the base 40 is about 28 cm. In some embodiments, a width of the base 40 is 19.2 cm. In some embodiments, an outer dimension of the rectangular hollow tube of the trailer hitch 260 is 6.25 cm×6.25 cm and an inner dimension of the rectangular hollow tube of the trailer hitch 260 is 5.1 cm×5.1 cm.

Figure 10:
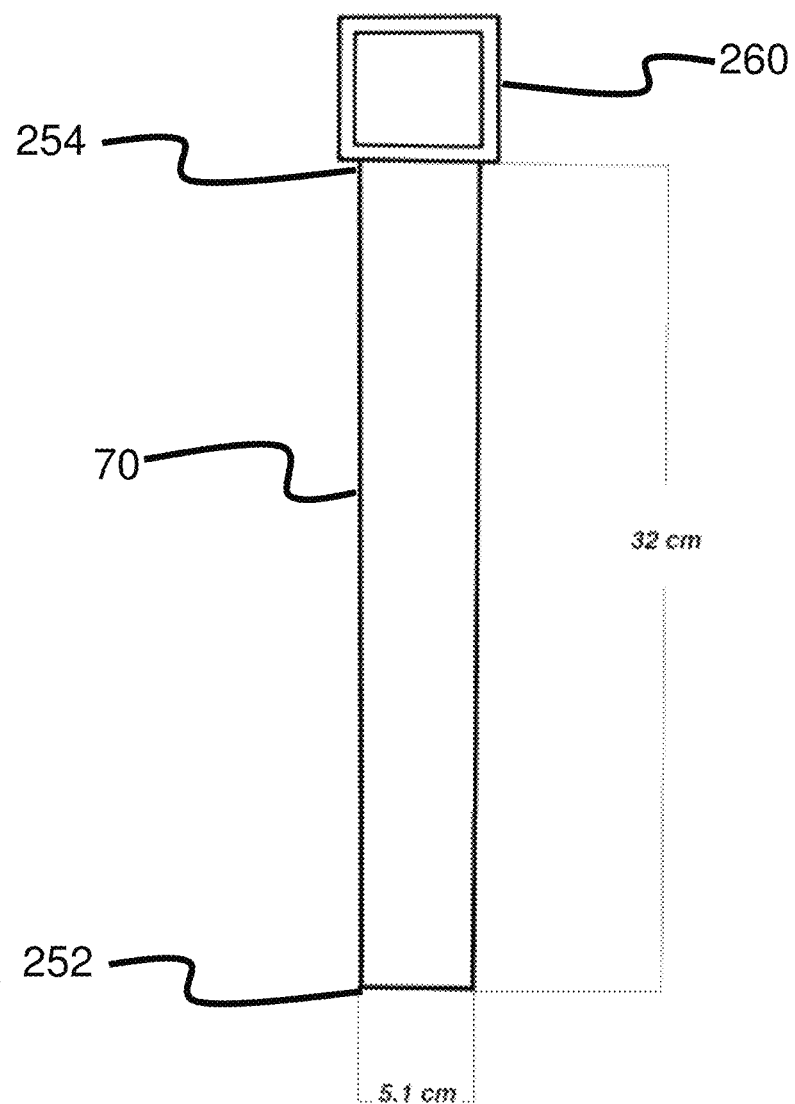
FIG. 10 is a front view of the riser and trailer hitch of FIG. 3.

As can be seen in FIG. 10, a vertical height of the riser 70 comprises a height between the lower end 252 and the upper end 254 of the first tubular post 250 which includes a dimension of 32 cm. In some embodiments, an outer dimension of the riser 70 comprises 5.1 cm×5.1 cm.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A trailer docking device comprising:
   a base including a baseplate defining a plurality of holes usable to secure the baseplate to a permanent surface;
   a riser extending vertically from the baseplate;
   a ball mount attached to and supported by the riser;
   wherein said ball mount is attached to said riser via a trailer hitch into which the ball mount is removably mated.

2. The trailer docking device of claim 1 wherein said riser has a height that is adjustable.

3. The trailer docking device of claim 2, wherein the riser further comprises:
   a first tubular post extending upwardly from said base and said first tubular post comprising an aperture extending from a first side to a second side of said first tubular post;
   a second tubular post telescopically arranged with the first tubular post.

4. The trailer docking device of claim 3, wherein said second tubular post is configured to be slidably locked inside said first tubular post at a plurality of selectable heights relative to said first tubular post when said aperture of said first tubular post is aligned with at least one of said plurality of apertures of said second tubular post and is locked in place with a locking pin.

5. The trailer docking device of claim 4, wherein said plurality of heights of said second tubular post relative to said first tubular post comprises a height between said baseplate and said tongue when said aperture of said first tubular post is aligned and locked with each of said plurality of apertures of said second tubular post.

6. A trailer docking device comprising:
   a base including a baseplate defining a plurality of holes usable to secure the baseplate to a permanent surface;
   a riser extending vertically from the baseplate;
   a ball mount attached to and supported by the riser wherein said riser has a height that is adjustable
   wherein the riser further comprises:
      a first tubular post extending upwardly from said base and said first tubular post comprising an aperture extending from a first side to a second side of said first tubular post;
      a second tubular post telescopically arranged with the first tubular post
   wherein a detached trailer is attached to a tongue of said ball mount by a hitch ball.

7. The trailer docking device of claim 6, wherein said aperture extending from the first side to the second side of said first tubular post is positioned near an opposite end of said baseplate of said first tubular post.

8. The trailer docking device of claim 6, wherein a cross-section of said first tubular post is larger than a cross-section of said second tubular post.

9. The trailer docking device of claim 6, wherein said first tubular post and said second tubular post are constructed of steel.

10. The trailer docking device of claim 6, wherein said detached trailer is secured to said tongue when said hitch ball is inserted through a hole on said tongue and is locked with a lock washer and a lock nut.

11. The trailer docking device of claim 6, wherein said detached trailer is configured to load or unload when said detached trailer is secured to said tongue of said trailer docking device.

12. A trailer docking device, comprising:
   a base having a baseplate permanently mountable to a surface;
   a riser extending vertically from said base;
   a trailer hitch comprising a hollow tube having at least a distal open end and at least two parallel distal mounting holes positioned on both sides of the hollow tube, wherein said trailer hitch is positioned at a top end of said riser.

13. The trailer docking device of claim 12, wherein the riser further comprising:
   a first tubular post extending upwardly from said base and said first tubular post comprising an aperture extending from a first side to a second side of the first tubular post;
   a second tubular post comprising the trailer hitch at a first end and a plurality of apertures positioned downwardly and extending from a first side to a second side of said second tubular post.

14. The trailer docking device of claim 13, wherein said second tubular post slides and locks inside said first tubular post at a plurality of heights when a locking pin engages said aperture of said first tubular post and at least one of said plurality of apertures of said second tubular post and locks said second tubular post relative to said first tubular post.

15. The trailer docking device of claim 13, wherein a ball mount of a detached trailer is attached to said trailer hitch.

16. The trailer docking device of claim 15, wherein said ball mount of said detached trailer comprises a hollow tube at one end which is configured to slide inside said trailer hitch and be locked in place with mounting holes.

17. The trailer docking device of claim 12, wherein said baseplate defines a plurality of holes through which fasteners may be placed to mount said baseplate to said surface.

18. A method of securing a trailer to a permanent surface comprising:
   securing a docking device to the permanent surface through a plurality of holes in a base of said docking device, the docking device having a ball mount and the ball mount having a tongue;

adjusting a riser extending vertically from the base, the riser having a first tubular post extending upwardly from said base and said first tubular post comprising an aperture extending from a first side to a second side of said first tubular post; and a second tubular post telescopically arranged with the first tubular post;

attaching a hitch ball to the tongue;

placing the trailer over the hitch ball;

latching the trailer to the hitch ball.

19. The method of claim 18, wherein said method further comprises loading and unloading of a detached trailer after securing said detached trailer to said trailer docking device.

20. The method of claim 18, wherein said method comprising permanently securing a baseplate of said docking device to said permanent surface.

21. The method of claim 18, further comprising locking said trailer to said docking device.

\* \* \* \* \*